(12) United States Patent
Gilmore et al.

(10) Patent No.: US 6,415,665 B1
(45) Date of Patent: Jul. 9, 2002

(54) ULTRASONIC PROBE AND METHOD FOR MONITORING MATERIALS PROCESSING IN SCREW DRIVEN EXTRUDERS

(75) Inventors: Robert Snee Gilmore, Charlton, NY (US); Mahari Tjahjadi, Evansville, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/523,931

(22) Filed: Mar. 13, 2000

(51) Int. Cl.[7] .............................................. G01N 29/18
(52) U.S. Cl. ...................... 73/597; 73/61.75; 425/169
(58) Field of Search .......................... 73/597, 629, 644, 73/61.75, 64.42; 264/211.21; 425/169

(56) References Cited

U.S. PATENT DOCUMENTS

| | | | |
|---|---|---|---|
| 3,806,099 A | 4/1974 | Gallard et al. | 259/192 |
| 4,137,025 A | * 1/1979 | Graves et al. | 73/629 |
| 5,951,163 A | * 9/1999 | Jen et al. | 73/644 |
| 5,974,886 A | 11/1999 | Carroll et al. | 73/598 |

FOREIGN PATENT DOCUMENTS

| | | |
|---|---|---|
| CH | 542047 A | 11/1973 |
| JP | 08276490 | 10/1996 |

* cited by examiner

*Primary Examiner*—John E. Chapman
(74) *Attorney, Agent, or Firm*—David C. Goldman; Jill M. Breedlove

(57) ABSTRACT

An ultrasonic probe and method for noninvasively monitoring materials processing in screw driven extruders. The noninvasive probe includes at least one ultrasonic transducer operable to transmit an ultrasonic signal on a signal path intersecting an inner sidewall of a barrel of the extruder and material between the inner sidewall of the barrel and an outer surface of a screw within the barrel. Information about the state of the material intersected by the ultrasonic signal is ascertainable from an elapsed time between reception of a first reflection of the ultrasonic signal and reception of a second reflection of the ultrasonic signal. The first reflection results when the ultrasonic signal exits the inner sidewall of the barrel and the second reflection results when the ultrasonic signal reaches one of the outer surface of the screw and partially solid material.

10 Claims, 5 Drawing Sheets

ULTRASONIC PROBE AND METHOD FOR MONITORING MATERIALS PROCESSING IN SCREW DRIVEN EXTRUDERS

FIELD OF THE INVENTION

The present invention relates generally to process monitoring in screw driven extruders, and more particularly to an ultrasonic probe and method for noninvasively monitoring materials processing in screw driven extruders.

BACKGROUND OF THE INVENTION

Screw driven extruders are widely used in the manufacture of engineered plastics, polymer composites, and numerous components and products made therefrom. In screw driven extruders, the material being extruded is forced by the screw threads of the turning screw through the barrel of the extruder. The force of the screw heats the material. Thus, the material within the barrel may be in one of several different states, such as a solid state, a partially molten state, or a totally molten state, at different locations along the barrel of the extruder. Both process yield and quality may be improved by monitoring the state of the material being blended and processed between the extruder barrel and screw and using information generated thereby to control various process parameters, such as, for example, the rotational speed of the screw. However, the temperature, pressure and viscous shear required to drive the materials processing can severely limit the life of an invasive probe that can detect the state of the material.

SUMMARY OF THE INVENTION

Accordingly, there is a particular need for a probe and method of non-invasively monitoring the state of the material being extruded at selected locations along the barrel of a screw driven extruder.

In accordance with the present invention, there is provided a noninvasive probe for monitoring materials processing in a screw driven extruder. The probe comprises at least one ultrasonic transducer. The transducer is operable to transmit an ultrasonic signal on a signal path intersecting material between an inner sidewall of the barrel of the extruder and an outer surface of the screw within the barrel. Information about the state of the material intersected by the ultrasonic signal is ascertainable from an elapsed time between reception of a first reflection of the ultrasonic signal, resulting when the ultrasonic signal exits the inner sidewall of the barrel, and reception of a second reflection of the ultrasonic signal, resulting when the ultrasonic signal reaches the outer surface of the screw or partially solid material. For example, an elapsed time of a first duration A may indicate that the signal is intersecting completely molten material between the barrel and the screw. An elapsed time of a second duration B<A may indicate that the signal is intersecting partially molten and partially solid material between the barrel and the screw. An elapsed time of a third duration C<B may indicate that the signal is intersecting a thin layer of molten material in the gap between the barrel and the land of the screw.

In one embodiment of the present invention, a noninvasive probe for monitoring materials processing in a screw driven extruder comprises first, second and third ultrasonic transducers. The first, second and third transducers are operable to transmit first, second and third ultrasonic signals, respectively, on signal paths intersecting an inner sidewall of the barrel of the extruder and material between the inner sidewall of the barrel and an outer surface of the screw within the barrel. Information about the state of the material intersected by each ultrasonic signal is ascertainable from an elapsed time between reception of a first reflection of each ultrasonic signal and reception of a second reflection of each ultrasonic signal. The first reflections result when the ultrasonic signals exit the inner sidewall of the barrel and the second reflections result when the ultrasonic signals reach the outer surface of the screw or partially solid material.

In accordance with the present invention, there is provided a method of noninvasively monitoring material being processed in a screw driven extruder. The method comprises a first step of positioning at least one ultrasonic transducer for transmitting an ultrasonic signal on a signal path intersecting material between an inner sidewall of the barrel of the extruder and an outer surface of the screw within the barrel. An ultrasonic signal is then transmitted from the transducer. At least first and second reflections of the ultrasonic signal are then received. The first reflection results when the ultrasonic signal exits the inner sidewall of the barrel and the second reflection results when the ultrasonic signal reaches the outer surface of the screw or partially solid material. The state of the material intersected by the signal is then determined from the elapsed time between reception of the first and the second reflections.

DESCRIPTION OF THE DRAWINGS

For a more complete understanding of the present invention, reference is now made to the following detailed description taken in conjunction with the accompanying figures, wherein like referenced numerals represent like parts, in which.

DETAILED DESCRIPTION

Figure 1:
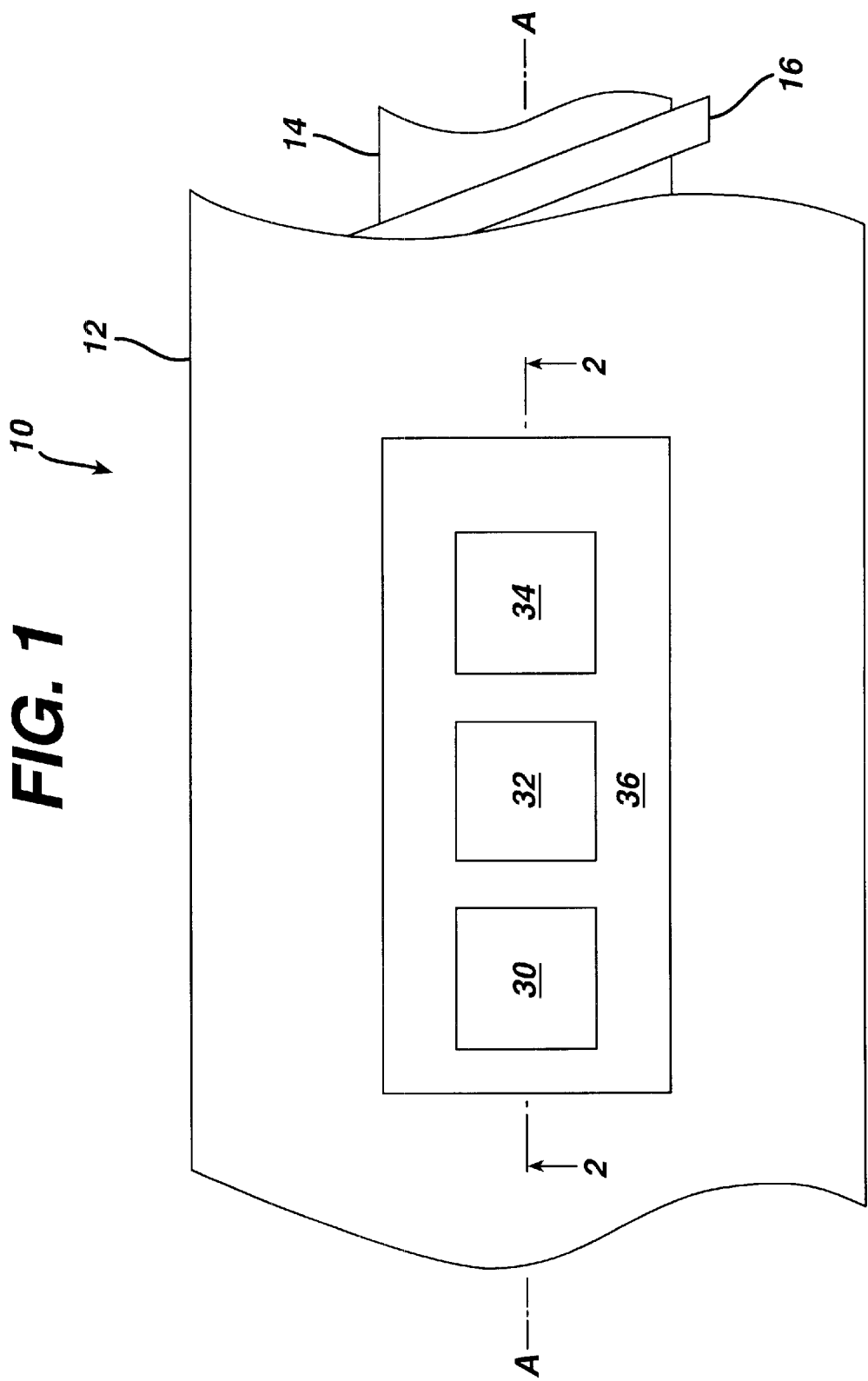
FIG. 1 shows a top view of one embodiment of a noninvasive probe in accordance with the present invention.
Figure 2:
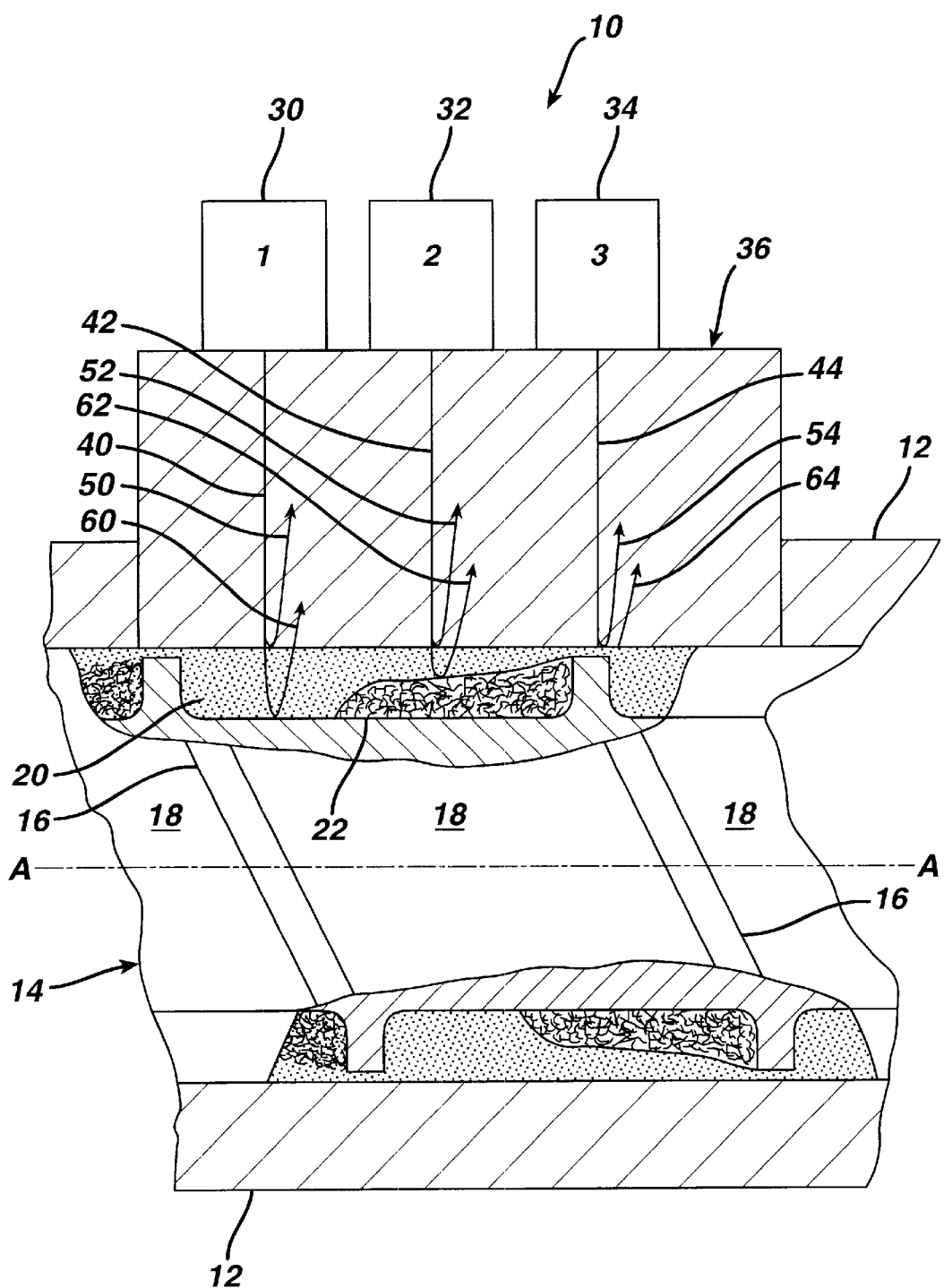
FIG. 2 shows a cross sectional view of the probe taken along line 2—2 in FIG. 1 for a first axial position of the extruder screw.
Figure 3:
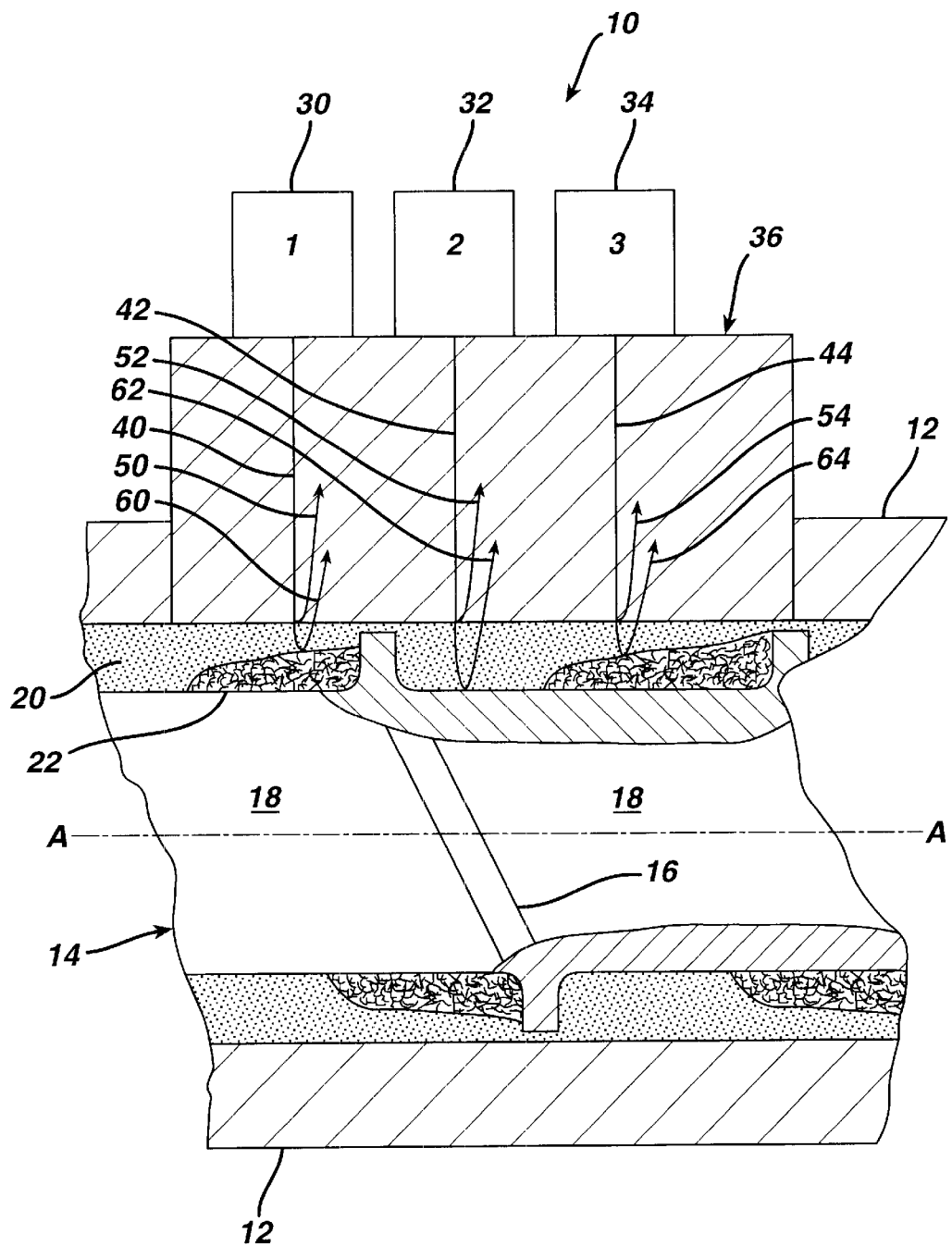
FIG. 3 shows a cross sectional view of the probe taken along line 2—2 in FIG. 1 for a second axial position of the extruder screw.

FIGS. 1, 2 and 3 show top and cross-sectional views of one embodiment of a noninvasive probe 10 for monitoring materials processing in a screw driven extruder including a barrel 12 having a screw 14 therein. As the screw 14 is rotated about axis A—A within the barrel 12, the screw land 16 forces material in the groove 18 of the screw 14 through the barrel 12 (e.g. from right to left in FIGS. 2 and 3). Pressure applied to the material by the screw 14 to force the material through the barrel 12 heats the material. Thus, material in the barrel 12 may be in different states in different regions. For example, as is illustrated, in the region immediately aft of the screw land 16 (to the right of the screw land 16 in FIGS. 2 and 3) the material may be in a completely molten state 20, whereas in the region immediately forward of the screw land 16 (to the left of the screw land 16 in FIGS.

2 and 3) the material may be in a partially solid state 22 (i.e. molten material with solid particles therein).

The embodiment of the probe 10 shown includes first, second and third ultrasonic transducers 30, 32 and 34. It should be appreciated that in other embodiments of the present invention, the probe 10 may include fewer transducers or more than three transducers. The first, second and third transducers 30, 32, 34 are positioned outside of the barrel 12 in a line parallel with the longitudinal axis A—A of the barrel 12 and screw 14. The first, second and third transducers 30, 32 and 34 are oriented for transmitting first, second and third ultrasonic signals 40, 42 and 44 on signal paths intersecting an inner sidewall of the barrel 12 and material between the inner sidewall of the barrel 12 and an outer surface of the screw 14.

The transducers 30, 32, 34 are preferably mounted on a thicker region of the barrel 12 sidewall. The thicker sidewall region may be formed by a water cooled stub 36 that is positioned in an opening through the sidewall of the barrel 12. The stub 36 should be configured and positioned to provide an inner surface consistent with the inner sidewall of the barrel 12. The water cooled stub 36 should also have the same structure as the barrel 12 with respect to wear resistant layers on the interior barrel 12 surface. Such wear resistant layers, while harder and more abrasion resistant than an unlined steel barrel 12, are sufficiently close in ultrasonic properties to the steel that they present no impediment to the ultrasonic monitoring of the state of the material inside the barrel 12. The stub 36 provides a relatively cool mounting surface for the transducers 30, 32, 34 and also provides unbroken signal paths for ultrasonic signals 40, 42, 44 to the interior of the barrel 12.

As is shown in FIG. 2, the three transducers 30, 32, 34 may be spaced apart from one another such that for a predetermined axial position of the screw 14 (e.g. 0 degrees), the first transducer 30 insonifies (i.e. the first signal 40 intersects) an area of the groove 18 of the screw 14 immediately aft of the screw land 16, the second transducer 32 insonifies (i.e. the second signal 42 intersects) the central area of the groove 18 of the screw 14, and the third transducer 34 insonifies (i.e. the third signal 44 intersects) the screw land 16. As may be appreciated, as the screw 14 rotates, the transducers 30, 32, 34 will insonify different regions. For example as is shown in FIG. 3, when the screw 14 has rotated 180 degrees from the 0 degree position shown in FIG. 2, the first transducer 30 insonifies an area of the groove 18 immediately forward of the screw land 16, the second transducer 32 insonifies an area of the groove 18 immediately aft of the screw land 16, and the third transducer 34 insonifies the central area of the groove 18.

First reflections 50, 52, 54 of the first, second and third signals 40, 42, 44 result when the first, second and third signals 40, 42, 44, respectively, exit the inner sidewall of the stub 36 and enter the molten material 20. The first, second and third ultrasonic signals 30, 32, 34 are also reflected a second time at the boundary between the molten material 20 and the screw 14, the partially solid material 22 or the screw land 16, depending upon the axial position of the screw 14. For the 0 degree axial position of the screw 14 shown in FIG. 2, a second reflection 60 of the first signal 40 results when the first signal 40 reaches the surface of the groove 18 of the screw 14. A second reflection 62 of the second signal 42 results when the second signal 32 reaches the boundary between the completely molten material 20 and the partially solid material 22. A second reflection 64 of the third signal 44 results when the third signal 44 reaches the screw land 14. For the 180 degree axial position of the screw 14 shown in FIG. 3, the second reflection 60 of the first signal 40 results when the first signal 40 reaches the boundary between the completely molten material 20 and the partially solid material 22. A second reflection 62 of the second signal 42 results when the second signal 32 reaches the surface of the groove 18 of the screw 14. A second reflection 64 of the third signal 44 results when the third signal 44 reaches the boundary between the completely molten material 20 and the partially solid material 22.

Figure 4:
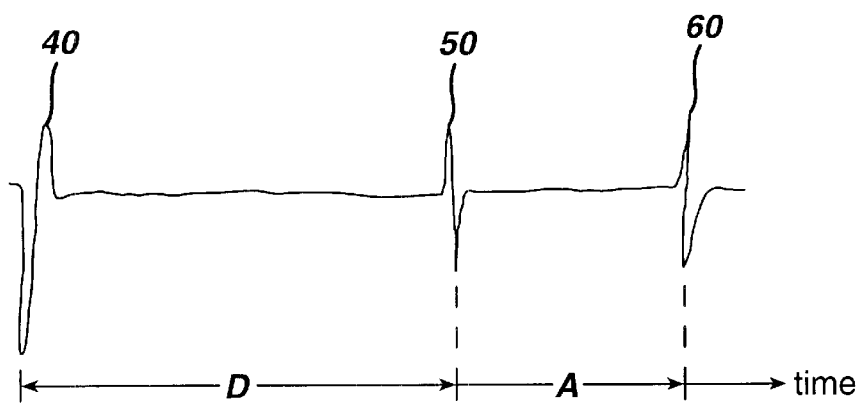
FIG. 4 shows exemplary ultrasonic signal patterns from the first transducers of the probe of FIG. 1.
Figure 5:
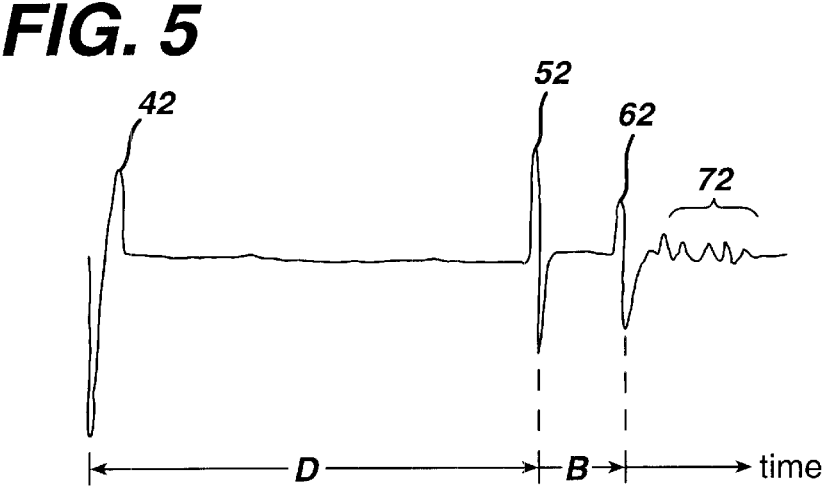
FIG. 5 shows exemplary ultrasonic signal patterns from the second transducer, of the probe of FIG. 1.
Figure 6:
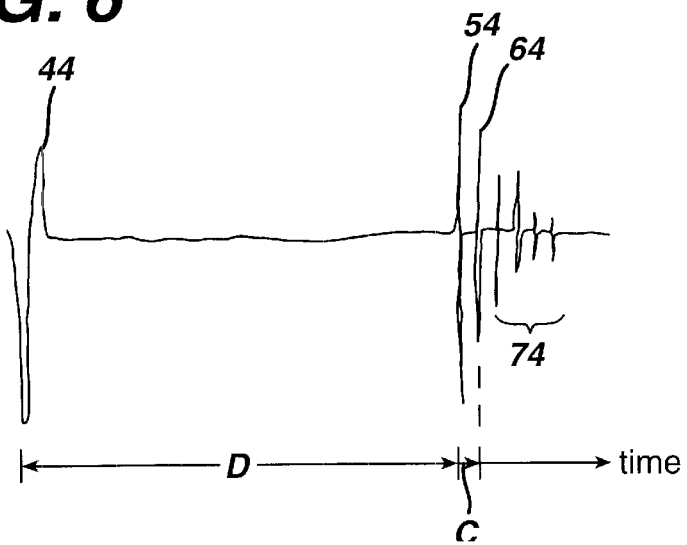
FIG. 6 shows exemplary ultrasonic signal patterns from the third transducer, of the probe of FIG. 1.

Referring now to FIGS. 4–6, information about the state of the material insonified by the transducers 30, 32, 34 is ascertainable from an elapsed time between reception of the first reflections 50, 52, 54 and reception of the second reflections 60, 62, 64 of the first, second and third ultrasonic signals 40, 42, 44, respectively.

FIG. 4 shows an exemplary ultrasonic signal pattern associated with the first transducer 30 for the 0 degree axial position of the screw illustrated in FIG. 2. The first ultrasonic signal 40 is transmitted and after a time delay D, the first reflection 50 of the first signal 40 is received. As may be appreciated, time delay D is a function of the thickness of the stub 36 and the velocity of the first ultrasonic signal 30 through the stub 36. For example, for a 50.8 mm thick stub 36 and a velocity of 5.84 mm/sec, time delay D should be approximately 17.4 $\mu$sec. After a further time delay A, the second reflection 60 of the first signal 30 is received. Time delay A is a function of the distance from the inner sidewall of the stub 36 to the screw 14 and the velocity of the first ultrasonic signal 30 through the molten material 20 therebetween. For example, for a distance of 7.5 mm and a velocity of 1.9 mm/sec, time delay A should be approximately 7.9 $\mu$sec.

FIG. 5 shows an exemplary ultrasonic signal pattern associated with the second transducer 32 for the 0 degree axial position of the screw 14 illustrated in FIG. 2. The second ultrasonic signal 42 is transmitted and after a time delay D, the first reflection 52 of the second signal 42 is received. After a further time delay B, the second reflection 62 of the second signal 32 is received. Time delay B is a function of the distance from the inner sidewall of the stub 36 to the partially solid material 22 and the velocity of the first ultrasonic signal 30 through the molten material 20. For example, for a distance of 375 mm and a velocity of 1.9 mm/sec, time delay B should be approximately 3.95 $\mu$sec. In addition to the first and second reflections 52, 62 of the second signal 42, there may be echoes 72 from solid particles in the partially solid material 22.

FIG. 6 shows an exemplary ultrasonic signal pattern associated with the third transducer 34 for the 0 degree axial position of the screw illustrated in FIG. 2. The third ultrasonic signal 44 is transmitted and after a time delay D, the first reflection 54 of the third signal 44 is received. After a further time delay C, the second reflection 64 of the third signal 34 is received. Time delay C is a function of the gap between the barrel 12 and the screw land 16 and the velocity of the third ultrasonic signal 30 through the thin layer of molten material 20 in the gap. For example, for a gap of 0.5 mm and a velocity of 1.9 mm/sec, time delay C should be approximately 0.525 $\mu$sec. In addition to the first and second reflections 54, 64 of the third signal 44, there may be additional echoes 74 from the barrel 12 and screw land 16.

Thus, as the screw 14 rotates, a time delay of duration A for a particular transducer 30, 32, 34 indicates that the transducer is insonifying completely molten material, a time delay of duration B<A indicates that the transducer is insonifying partially solid material, and a time delay of duration C<B indicates that the transducer is insonifying molten material in the gap between the inner sidewall of the stub 36 and the screw land 16. In essence, the transducers 30, 32, 34 provide a solid-melt profile of the material being extruded. By including more than the three transducers 30, 32, 34 shown along a line parallel to the axis A—A of the extruder barrel 12, more resolution of the axial solid-melt profile at each circumferential position of the screw 14 may be obtained. As the number of transducers parallel to the axis A—A of the extruder barrel 12 is increased, the probe 10 becomes a linear phased array. Such an array may be used to make B-scan profiles of the material between the barrel 12 and the screw 14.

Figure 7:
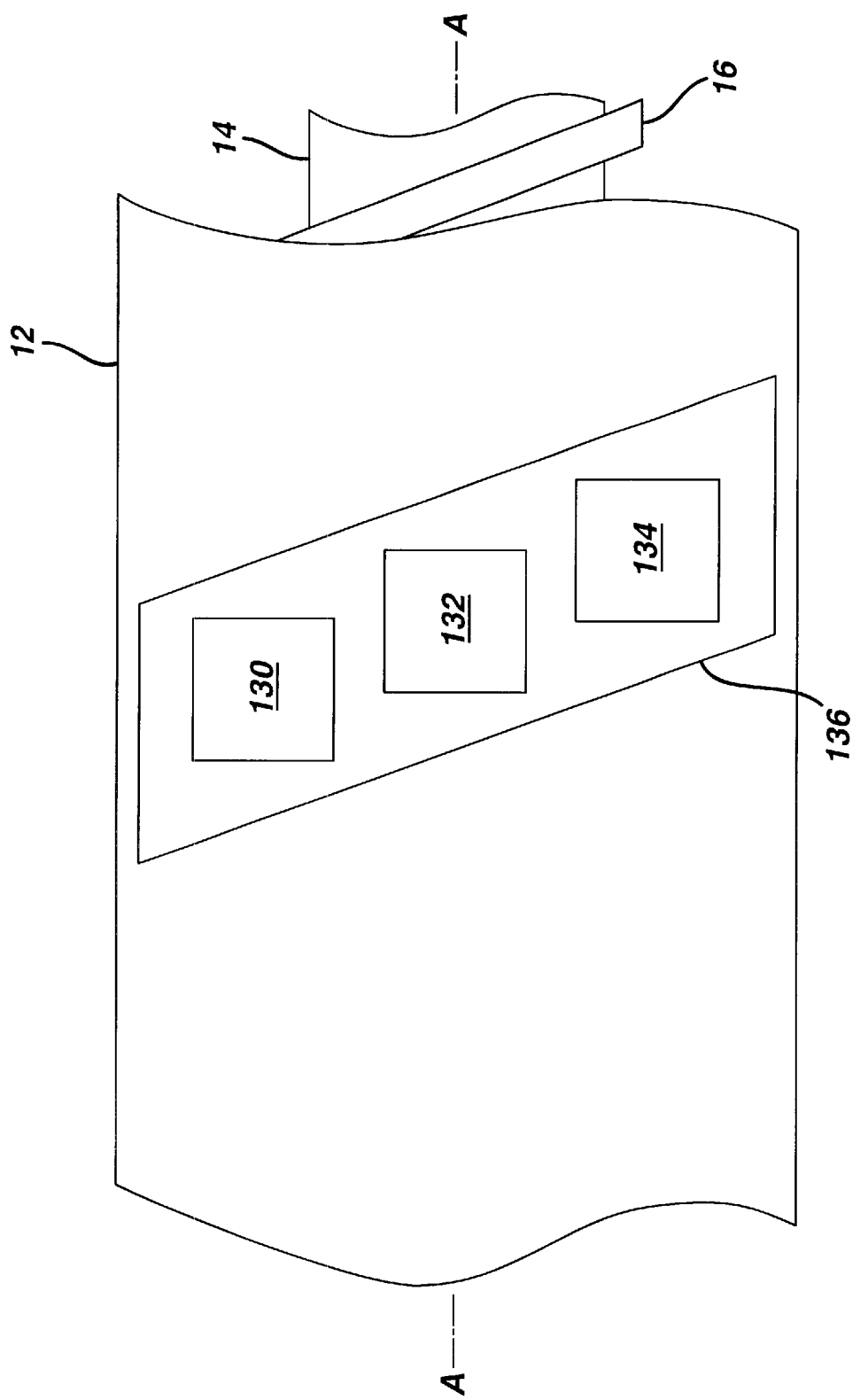
FIG. 7 shows a top view of another embodiment of a noninvasive probe in accordance with the present invention.

Referring now to FIG. 7, there is shown a top view of another embodiment of a noninvasive probe 110 for monitoring materials processing in a screw driven extruder including a barrel 12 having a screw 14 therein. In this embodiment, first, second and third transducers 130, 132, 134 are arranged along a line parallel to the spiral of the screw land 16 of the screw 14. In this regard, the three transducers 130, 132, 134 are arranged in a helical spiral fashion matching the spiral of the screw land 16. As before, the transducers 130, 132, 134 are preferably mounted on a thicker region of the barrel 12 sidewall formed by a water cooled stub 136. With such a spiral configuration, the probe 110 may be utilized to examine the uniformity of the material being processed along such spiral for successive positions of the screw 14 as it rotates. As the number of transducers arranged in the spiral configuration is increased, the probe 110 becomes a helical phased array parallel to the screw land 16.

While various embodiments of the present invention have been described in detail, it is apparent that further modifications and adaptations of the invention may occur to those skilled in the art. However, it is expressly understood that such modifications and adaptations are within the spirit and scope of the present invention.

What is claimed is:

1. A noninvasive probe for monitoring materials processing in a screw driven extruder comprising:

a plurality of ultrasonic transducers arranged in a line parallel with an axis of a barrel of the extrduer, forming a linear phased array operable to provide a B-scan profile of material between the barrel and a screw within the barrel over at least some portion of the length of the screw, wherein each of said plurality of ultrasonic transducers are operable to transmit an ultrasonic signal on a signal path intersecting an inner sidewall of the barrel and material between the inner sidewall of the barrel and an outer surface of the screw, wherein information about the state of the material intersected by said ultrasonic signal is ascertainable from an elapsed time between reception of a first reflection of said ultrasonic signal and reception of a second reflection of said ultrasonic signal, said first reflection resulting when said ultrasonic signal exits the inner sidewall of the barrel and said second reflection resulting when said ultrasonic signal reaches one of the outer surface of the screw and partially solid material.

2. The probe of claim 1 wherein each of said plurality of ultrasonic transducers are operable to ascertain that an elapsed time of a first duration A indicates that the signal is intersecting completely molten material between the barrel and the screw, an elapsed time of a second duration B<A indicates that the signal is intersecting partially molten and partially solid material between the barrel and the screw, and an elapsed time of a third duration C<B indicates that the signal is intersecting molten material in a gap between the barrel and the land of the screw.

3. A noninvasive probe for monitoring materials processing in a screw driven extruder comprising:

a plurality of ultrasonic transducers arranged in a helical spiral matching a spiral configuration of a land of a screw within a barrel of the extrduer, wherein each of said plurality of ultrasonic transducers are operable to transmit an ultrasonic signal on a signal path intersecting an inner sidewall of the barrel and material between the inner sidewall of the barrel and an outer surface of the screw within the barrel, wherein information about the state of the material intersected by said ultrasonic signal is ascertainable from an elapsed time between reception of a first reflection of said ultrasonic signal and reception of a second reflection of said ultrasonic signal, said first reflection resulting when said ultrasonic signal exits the inner sidewall of the barrel and said second reflection resulting when said ultrasonic signal reaches one of the outer surface of the screw and partially solid material.

4. The probe of claim 3 wherein said plurality of ultrasonic transducers comprise a helical phased array operable for examining the uniformity of the material along such spiral for successive axial positions of the screw as the screw rotates.

5. The probe of claim 3 wherein each of said plurality of ultrasonic transducers are operable to ascertain that an elapsed time of a first duration A indicates that the signal is intersecting completely molten material between the barrel and the screw, an elapsed time of a second duration B<A indicates that the signal is intersecting partially molten and partially solid material between the barrel and the screw, and an elapsed time of a third duration C<B indicates that the signal is intersecting molten material in a gap between the barrel and the land of the screw.

6. A method of noninvasively monitoring material being processed in a screw driven extruder comprising:

positioning a plurality of ultrasonic transducers arranged in a line parallel with an axis of a barrel of the extrduer for forming a linear phased array operable to provide a B-scan profile of material between the barrel and a screw within the barrel over at least some portion of the length of the screw;

transmitting an ultrasonic signal from each of the plurality of ultrasonic transducers on a signal path intersecting material between an inner sidewall of the barrel and an outer surface of the screw;

receiving at least a first and a second reflection from each of the ultrasonic signals, the first reflection resulting when the ultrasonic signal exits the inner sidewall of the barrel and the second reflection resulting when the ultrasonic signal reaches one of the outer surface of the screw and partially solid material; and determining the state of the material intersected by the signal from an elapsed time between reception of the first and the second reflections.

7. The method of claim 6 wherein, in said determining, an elapsed time of a first duration A indicates that the signal is intersecting completely molten material between the barrel and the screw, an elapsed time of a second duration B<A indicates that the signal is intersecting partially molten and partially solid material between the barrel and the screw, and an elapsed time of a third duration C<B indicates that the signal is intersecting molten material in a gap between the barrel and the land of the screw.

8. A method of noninvasively monitoring material being processed in a screw driven extruder comprising:

positioning a plurality of ultrasonic transducers arranged in a helical spiral matching a spiral configuration of a land of a screw within a barrel of the extrduer;

transmitting an ultrasonic signal from each of the plurality of ultrasonic transducers on a signal path intersecting material between an inner sidewall of the barrel and an outer surface of the screw;

receiving at least a first and a second reflection from each of the ultrasonic signals, the first reflection resulting when the ultrasonic signal exits the inner sidewall of the barrel and the second reflection resulting when the ultrasonic signal reaches one of the outer surface of the screw and partially solid material; and determining the state of the material intersected by the signal from an elapsed time between reception of the first and the second reflections.

9. The method of claim 8 further comprising operating the plurality of transducers as a helical phased array to examine the uniformity of the material along the helical spiral for successive axial positions of the screw as the screw rotates.

10. The method of claim 8 wherein, in said determining, an elapsed time of a first duration A indicates that the signal is intersecting completely molten material between the barrel and the screw, an elapsed time of a second duration B<A indicates that the signal is intersecting partially molten and partially solid material between the barrel and the screw, and an elapsed time of a third duration C<B indicates that the signal is intersecting molten material in a gap between the barrel and the land of the screw.

* * * * *